(12) United States Patent
Dicker et al.

(10) Patent No.: US 8,893,105 B2
(45) Date of Patent: Nov. 18, 2014

(54) ACTIVATION-BASED REGULATORY UPDATES

(75) Inventors: George R. Dicker, Los Altos, CA (US); Andre M. J. Boule, San Jose, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 13/492,669

(22) Filed: Jun. 8, 2012

(65) Prior Publication Data

US 2013/0332718 A1    Dec. 12, 2013

(51) Int. Cl.
*G06F 9/44* (2006.01)
*G06F 9/445* (2006.01)

(52) U.S. Cl.
USPC ........... 717/168; 717/173; 717/174; 717/175; 717/176; 717/177; 717/178

(58) Field of Classification Search
None
See application file for complete search history.

(56) References Cited

U.S. PATENT DOCUMENTS

| | | | | |
|---|---|---|---|---|
| 5,835,858 A | * | 11/1998 | Vaihoja et al. | 455/419 |
| 5,956,505 A | * | 9/1999 | Manduley | 713/1 |
| 6,381,742 B2 | * | 4/2002 | Forbes et al. | 717/176 |
| 6,636,489 B1 | * | 10/2003 | Fingerhut | 370/328 |
| 6,842,769 B1 | * | 1/2005 | Kim et al. | 709/203 |
| 7,076,237 B2 | * | 7/2006 | Dawson et al. | 455/405 |
| 7,150,400 B2 | * | 12/2006 | Melick et al. | 235/462.25 |
| 7,937,699 B2 | * | 5/2011 | Schneider | 717/173 |
| 2006/0030291 A1 | * | 2/2006 | Dawson et al. | 455/405 |
| 2008/0046720 A1 | * | 2/2008 | Sugishita et al. | 713/156 |
| 2009/0089881 A1 | * | 4/2009 | Indenbom | 726/26 |
| 2010/0192120 A1 | * | 7/2010 | Raleigh | 717/101 |
| 2010/0293536 A1 | * | 11/2010 | Nikitin et al. | 717/168 |
| 2011/0050423 A1 | * | 3/2011 | Cova et al. | 340/572.1 |
| 2011/0291814 A1 | * | 12/2011 | Faith | 340/10.5 |
| 2012/0094684 A1 | * | 4/2012 | Reddy | 455/456.1 |
| 2012/0102484 A1 | * | 4/2012 | Hopmann et al. | 717/176 |
| 2012/0126953 A1 | * | 5/2012 | Mori et al. | 340/10.5 |
| 2013/0031541 A1 | * | 1/2013 | Wilks et al. | 717/176 |
| 2013/0080239 A1 | * | 3/2013 | Okerlund | 705/14.33 |

\* cited by examiner

*Primary Examiner* — Don Wong
*Assistant Examiner* — Roberto E Luna
(74) *Attorney, Agent, or Firm* — Park, Vaughan, Fleming & Dowler LLP; Chia-Hsin Suen

(57) ABSTRACT

The disclosed embodiments provide a system that activates an electronic device. The system includes an activation server that receives an activation request from the electronic device. Upon detecting, based on the activation request, that the electronic device requires a regulatory update, the activation server adds the regulatory update to an activation payload for the electronic device. Finally, the activation server transmits the activation payload to the electronic device.

17 Claims, 6 Drawing Sheets

ACTIVATION-BASED REGULATORY UPDATES

BACKGROUND

1. Field

The disclosed embodiments relate to activation of electronic devices. More specifically, the disclosed embodiments relate to techniques for providing regulatory updates to electronic devices during activation of the electronic devices.

2. Related Art

Recent improvements in computing power and wireless networking technology have significantly increased the capabilities of electronic devices. For example, laptop computers, tablet computers, portable media players, smartphones, digital media receivers, video game consoles, and/or other modern computing devices are typically equipped with WiFi and/or cellular capabilities that allow the computing devices to retrieve webpages, stream audio and/or video, share desktops and/or user interfaces (UIs), and/or transfer files wirelessly among one another.

These electronic devices may require regulatory approval from individual countries before the electronic devices can be operated in the countries. For example, the Federal Communications Commission (FCC) of the United States may assign an FCC Identification (ID) to radio frequency hardware in the electronic device to authorize use of the hardware in the United States. In turn, a regulatory mark for use of the electronic device in a particular country must appear on the electronic device before the electronic device can be used in the country. For example, regulatory marks for the electronic device may be found in a "settings" application within the electronic device to indicate the countries within which the electronic device is approved for operation.

However, regulatory approval may not be obtained from some countries until after manufacturing of the electronic device has already begun. As a result, versions of the electronic device that were produced before a country's regulatory approval was obtained may lack the required regulatory mark(s) from the country. To enable use of the previously produced versions in the country, each previously produced electronic device may be manually removed from packaging, updated with a new software build containing the complete set of regulatory marks, and repackaged for subsequent distribution and sale. Consequently, timing issues associated with regulatory approval of electronic devices by individual countries may negatively impact the manufacturing, sale, and use of the electronic devices in the countries.

SUMMARY

The disclosed embodiments provide a system that activates an electronic device. The system includes an activation server that receives an activation request from the electronic device. Upon detecting, based on the activation request, that the electronic device requires a regulatory update, the activation server adds the regulatory update to an activation payload for the electronic device. Finally, the activation server transmits the activation payload to the electronic device.

In some embodiments, the system also includes the electronic device. First, the electronic device transmits the activation request to the activation server. After receiving the activation payload from the activation server, the electronic device uses the activation payload to activate the electronic device. The electronic device then uses the regulatory update to update regulatory information on the electronic device as part of the activation (and prior to use of the electronic device by a user).

In some embodiments, the activation request includes status information about the electronic device that allows the electronic device to be configured for use during activation. For example, the activation request may contain a serial number that is unique to the electronic device and an operating system version installed on the electronic device. The activation request may also include a device type of the electronic device, such as the model name of the electronic device, as well as a hardware type and/or variant (e.g., of radio frequency hardware) associated with the electronic device.

In some embodiments, sending the activation request from the electronic device to the activation server includes transmitting the activation request over a cellular network connection. For example, the electronic device may communicate with the activation server by detecting a cellular tower in proximity to the electronic device and connecting to the cellular tower.

In some embodiments, detecting that the electronic device requires the regulatory update includes matching the status information for the electronic device from the activation request to the regulatory update. For example, a database query and/or table lookup may be performed using the status information to determine if the status information matches any regulatory updates for the electronic device.

In some embodiments, using the activation payload to activate the electronic device includes obtaining a certificate from the activation payload, and configuring the electronic device (e.g., for use by the user) based on the certificate.

In some embodiments, the regulatory update includes a regulatory identifier. For example, the regulatory identifier may represent regulatory approval to operate the electronic device in a particular country.

In some embodiments, using the regulatory update to update regulatory information on the electronic device includes at least one of:

(i) replacing an existing regulatory identifier on the electronic device with the regulatory identifier; and (ii) supplementing the existing regulatory identifier with the regulatory identifier.

In some embodiments, the regulatory information is read-only after activation.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

Figure 1:
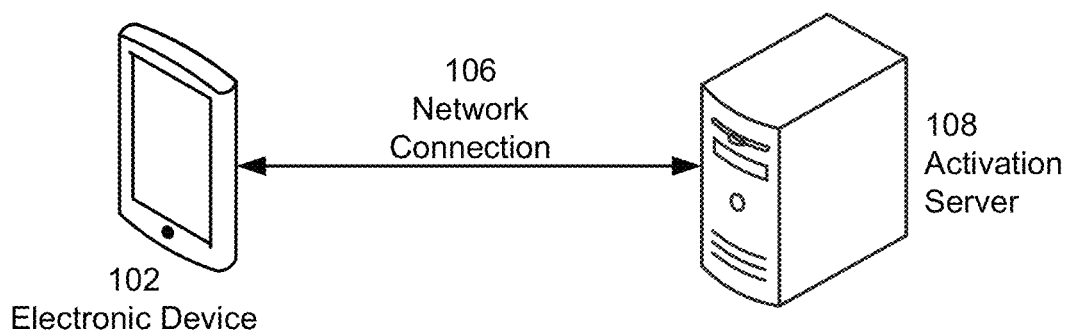
FIG. 1 shows a schematic of a system in accordance with the disclosed embodiments.

The disclosed embodiments provide a method and system for activating an electronic device such as a mobile phone, tablet computer, laptop computer, personal computer, personal digital assistant (PDA), portable media player, and/or digital media receiver. As shown in FIG. 1, an electronic device 102 may be activated by communicating with an activation server 108 prior to use of electronic device 102 by a user. For example, activation of electronic device 102 may occur after the user purchases electronic device 102, removes electronic device 102 from packaging, and powers on electronic device 102.

To communicate with activation server 108, electronic device 102 may establish a network connection 106 with activation server 108. For example, electronic device 102 may include cellular capabilities that allow electronic device 102 to connect to activation server 108 through a cellular network and/or the Internet. Alternatively, electronic device 102 may include networking capabilities that allow electronic device 102 to use a wired (e.g., Universal Serial Bus (USB)) connection with a different network-enabled device (e.g., a computer system) and/or an open WiFi connection to establish network connection 106 with activation server 108.

Figure 2:
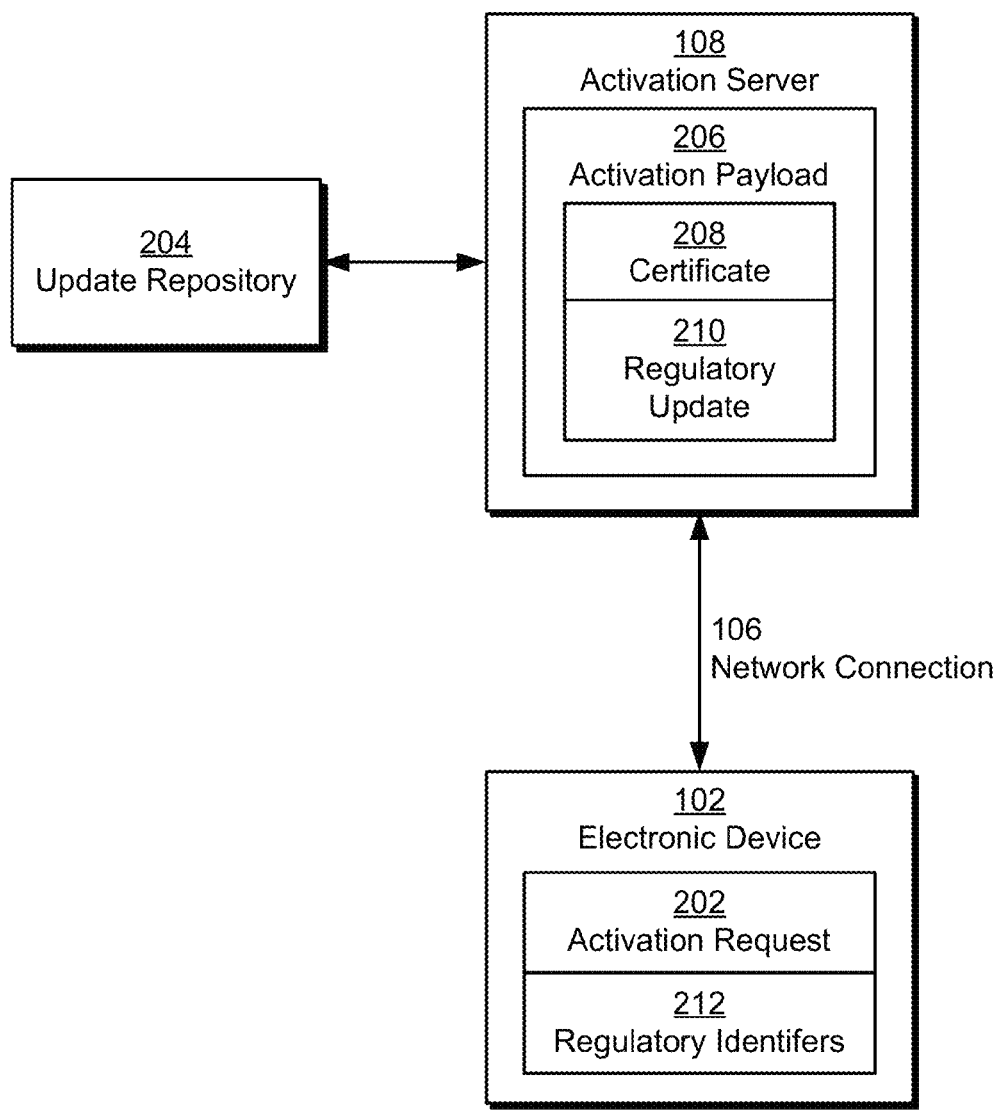
FIG. 2 shows a system for activating an electronic device in accordance with the disclosed embodiments.

Next, electronic device 102 and activation server 108 may carry out activation of electronic device 102 by sending and receiving data with one another over network connection 106. As shown in FIG. 2, electronic device 102 may transmit an activation request 202 to activation server 108 over network connection 106. Activation request 202 may include status information about electronic device 102 that allows electronic device 102 to be configured for use during activation. For example, activation request 202 may contain a serial number that is unique to electronic device 102 and an operating system version installed on electronic device 102. Activation request 202 may also include a device type of electronic device 102, such as the model name of electronic device 102, as well as a hardware type and/or variant (e.g., of radio frequency hardware) on electronic device 102.

After activation server 108 receives activation request 202, activation server 108 may transmit an activation payload 206 containing a certificate 208 to electronic device 102, and electronic device 102 may use certificate 208 and/or other parts of activation payload 206 to configure electronic device 102 for use by the user. For example, electronic device 102 may use activation payload 206, certificate 208, and/or other information from activation server 108 and/or network connection 106 to validate electronic device 102 as authentic, enable communication between electronic device 102 and a specific cellular network and/or carrier, and/or automatically configure a language setting in electronic device 102.

Those skilled in the art will appreciate that electronic device 102 may be manufactured before regulatory approval to operate electronic device 102 in a certain country is obtained. Electronic device 102 may thus lack a regulatory mark (e.g., Federal Communications Commission Identifier (FCC ID)) required to use electronic device 102 in the country (e.g., United States), even if regulatory approval for electronic device 102 is subsequently obtained from the country.

For example, an image representing the country's regulatory approval of electronic device 102 may be missing from a "settings" application on electronic device 102 that shows all regulatory identifiers 212 obtained for electronic device 102. Moreover, use of electronic device 102 in the country may be prohibited unless electronic device 102 is updated to include the image before electronic device 102 is first used by the user. As a result, electronic device 102 may not be sold and/or used in the country unless electronic device 102 is removed from packaging, updated with a new software build containing the image, and repackaged. In other words, regulatory approval of the electronic device for use in various countries may interfere with the manufacturing, sale, and/or use of the electronic device in the countries.

In one or more embodiments, the system of FIG. 2 includes functionality to provide a regulatory update 210 to electronic device 102 during activation of electronic device 102 so that regulatory identifiers 212 representing regulatory approval to use electronic device 102 in various countries are up-to-date. To provide regulatory update 210, activation server 108 may first examine activation request 202 to determine if electronic device 102 requires regulatory update 210. For example, activation server 108 may perform a database query and/or table lookup that matches status information for electronic device 102 (e.g., operating system version, device type, hardware type, etc.) from activation request 202 to regulatory update 210 in update repository 204 (e.g., a database). Alternatively, activation server 108 may determine that electronic device 102 does not require a regulatory update and/or regulatory information in electronic device 102 is already up-to-date if the status information does not match any regulatory updates in update repository 204.

If activation server 108 requires regulatory update 210, activation server 108 may obtain regulatory update 210 from update repository 204 and add regulatory update 210 to activation payload 206. Activation server 108 may then transmit activation payload 206 to electronic device 102 over network connection 106, and electronic device 102 may use certificate 208 to configure use of electronic device 102 by the user, as described above. Electronic device 102 may also use regulatory update 210 to update regulatory information on electronic device 102 so that the regulatory information is up-to-date and/or allows for use of electronic device 102 in the user's country by the time electronic device 102 is first used by the user (e.g., after activation is complete). Note that, in some embodiments, the regulatory information is read-only after activation (and hence may not be changed after activation).

In one or more embodiments, regulatory update 210 is a replacement for an existing regulatory identifier (e.g., from regulatory identifiers 212) on electronic device 102. For example, electronic device 102 may include a single image file that shows all existing regulatory identifiers 212 for electronic device 102 at the time at which electronic device 102 was manufactured. Regulatory update 210 may replace the image if regulatory update 210 includes all of the existing regulatory identifiers 212, as well as one or more additional regulatory identifiers that were obtained for electronic device 102 after the manufacture of electronic device 102. Regulatory update 210 may also replace the existing regulatory identifiers 212 if one or more existing regulatory identifiers 212 are incorrect (e.g., include a typo, list an incorrect number, etc.).

On the other hand, regulatory update 210 may be a supplement to the existing regulatory identifiers 212. For example, regulatory update 210 may supplement existing regulatory identifiers 212 if regulatory update 210 includes only regulatory identifiers that are not included in regulatory identifiers 212, such as regulatory identifiers that were obtained for electronic device 102 after the manufacture of electronic device 102. By providing regulatory update 210 as a supplement to regulatory identifiers 212, update repository 204 and/or activation server 108 may reduce the amount of data transmitted over network connection 106 to electronic device 102 during activation of electronic device 102, which in turn may reduce the overhead and/or amount of time required to activate electronic device 102. To further reduce the size of activation payload 206 and/or the activation time of electronic device 102, regulatory update 210 may include only the regulatory identifier for the country in which electronic device 102 is being activated and/or subsequently used, as detected by electronic device 102 and/or activation server 108.

If regulatory update 210 is a replacement for regulatory identifiers 212, electronic device 102 may replace a file (e.g., image) containing regulatory identifiers 212 with regulatory update 210. Electronic device 102 may then display regulatory update 210 to the user whenever the user accesses regulatory information on electronic device 102 (e.g., through a "settings" application). Alternatively, if regulatory update 210 is a supplement to regulatory identifiers 212, electronic device 102 may save both regulatory identifiers 212 and regulatory update 210 to disk (e.g., as two or more separate image files). Electronic device 102 may then display both regulatory identifiers 212 and regulatory update 210 (e.g., one after the other) to the user whenever the user accesses the regulatory information on electronic device 102. As described above, the regulatory identifiers (e.g., the above-described one or more images) may be read-only after the update is complete at activation, and hence may not be alterable.

The system of FIG. 2 may also be configured to deliver other types of regulatory updates to electronic device 102 during activation of electronic device 102. For example, activation server 108 may detect a change in a policy associated with operating electronic device 102 between the manufacturing and activation times of electronic device 102. To ensure that policies used to operate electronic device 102 are up-to-date, activation server 108 may include the policy in activation payload 206, and electronic device 102 may replace an existing policy on electronic device 102 with the policy in activation payload 206.

By including regulatory updates (e.g., regulatory update 210) in activation payload 206, the system of FIG. 2 may allow a previously manufactured electronic device 102 to comply with newly released regulatory requirements prior to use of electronic device 102 without manually removing electronic device 102 from packaging, installing additional software on electronic device 102, and/or repackaging electronic device 102. In other words, activation server 108 and/or electronic device 102 may extend the point of manufacture for electronic device 102 to the point of activation of electronic device 102, thus reducing overhead associated with reconfiguring electronic device 102 for legal use in a particular country prior to distributing and/or selling electronic device 102 in the country.

Figure 3:
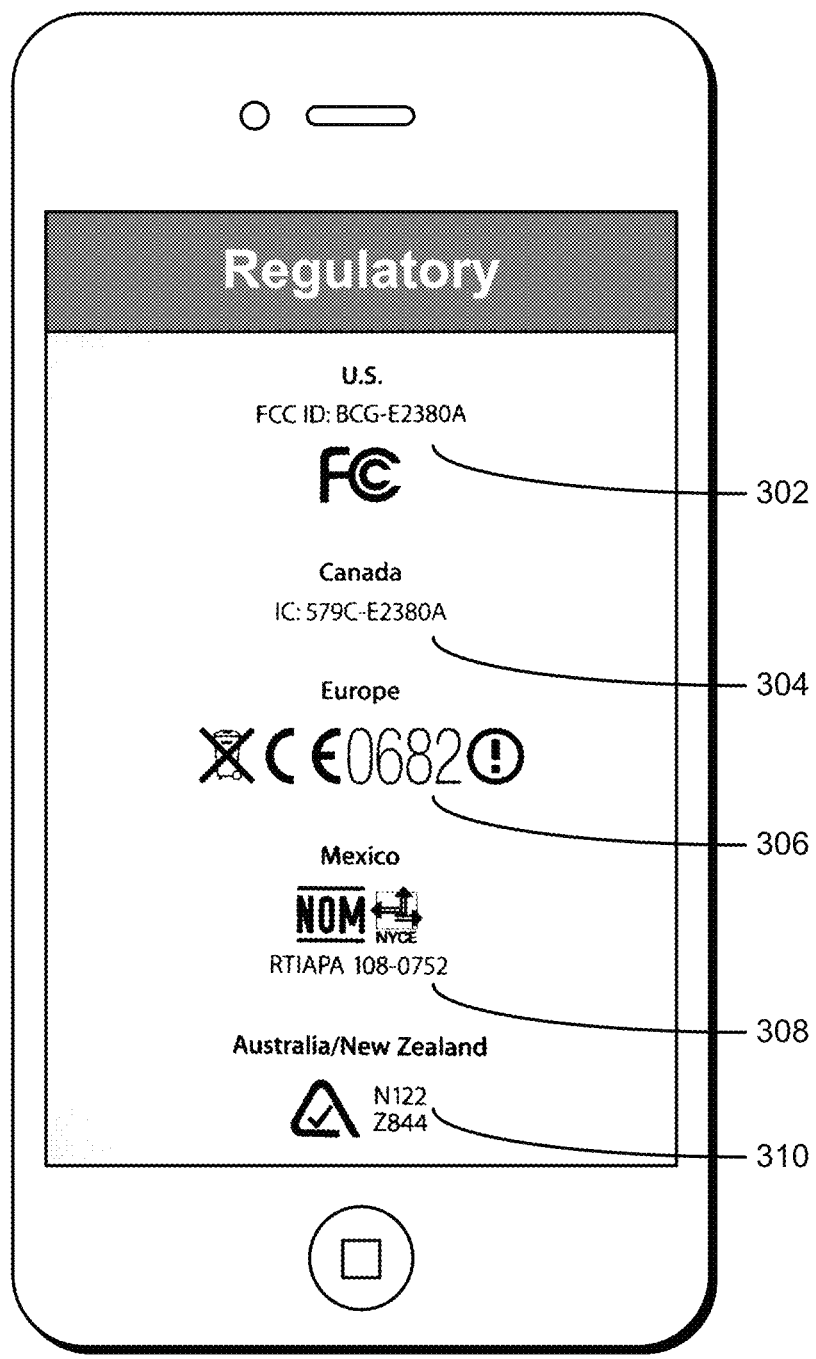
FIG. 3 shows an exemplary screenshot in accordance with the disclosed embodiments.

FIG. 3 shows an exemplary screenshot in accordance with the disclosed embodiments. More specifically, FIG. 3 shows a screenshot of a set of regulatory identifiers 302-310 for an electronic device, such as electronic device 102 of FIG. 1. As described above, regulatory identifiers 302-310 may indicate regulatory approval to operate the electronic device in various countries. For example, regulatory identifier 302 may represent regulatory approval to operate in the United States, and regulatory identifier 304 may represent regulatory approval to operate in Canada. Similarly, regulatory identifier 306 may represent regulatory approval to operate in Europe, regulatory identifier 308 may represent regulatory approval to operate in Mexico, and regulatory identifier 310 may represent regulatory approval to operate in Australia and New Zealand.

Regulatory identifiers 302-310 may also be modified and/or updated prior to use of the electronic device by a user. For example, regulatory identifiers 302-308 may be included in a software build that is installed on the electronic device during manufacturing of the electronic device. Regulatory identifier 310 may then be added to the electronic device after the electronic device is manufactured but before the electronic device is used by the user. To add regulatory identifier 310 before use of the electronic device, a regulatory update (e.g., regulatory update 210 of FIG. 2) containing regulatory identifier 310 may be added to an activation payload that is used to activate the electronic device.

The regulatory update may replace and/or supplement existing regulatory identifiers 302-308 on the electronic device. For example, the regulatory update may be a single image file that includes existing regulatory identifiers 302-308 and/or corrections to mistakes in existing regulatory identifiers 302-308 (e.g., typos, misspellings, etc.), as well as the newly added regulatory identifier 310. In turn, the electronic device may replace an existing image file containing only regulatory identifiers 302-308 with the regulatory update and display the regulatory update to the user whenever regulatory information for the electronic device is requested by the user. Alternatively, the regulatory update may be an image of just the newly added regulatory identifier 310. As a result, the electronic device may keep one or more image files containing existing regulatory identifiers 302-308 and concatenate and/or merge the regulatory update containing regulatory identifier 310 with the existing regulatory identifiers 302-308.

Figure 4:
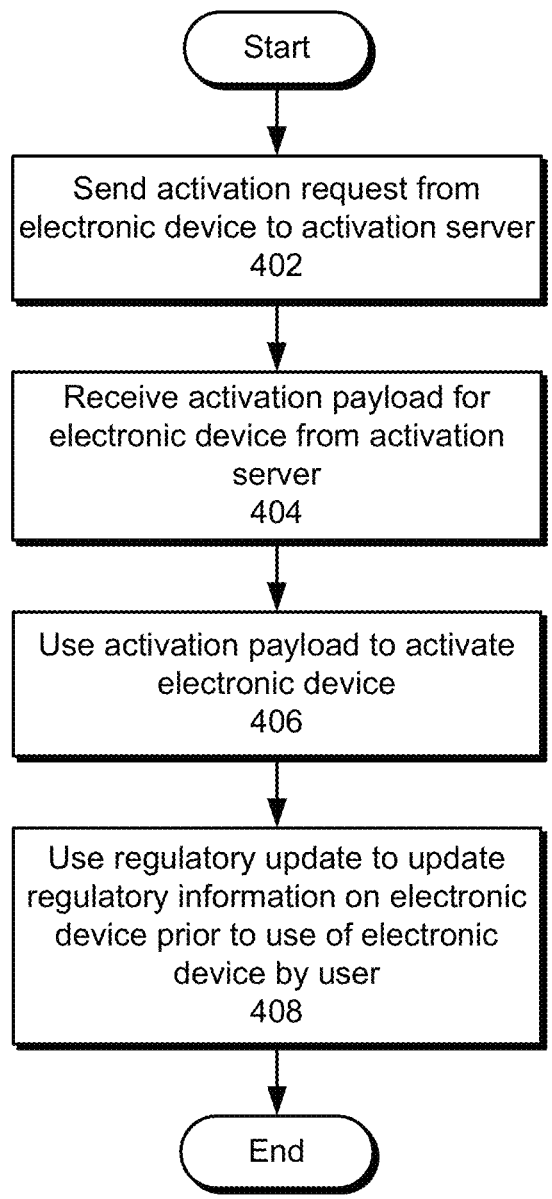
FIG. 4 shows a flowchart illustrating the process of activating an electronic device in accordance with the disclosed embodiments.

FIG. 4 shows a flowchart illustrating the process of activating an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, an activation request is sent from the electronic device to an activation server (operation 402). For example, the electronic device may connect to the activation server using a cellular, wired, and/or wireless network connection and transmit the activation request to the activation server over the network connection. As mentioned above, the activation request may include status information for the electronic device, such as a serial number, operating system version, device type (e.g., model name), and/or hardware type (e.g., hardware variant, hardware model name).

Next, an activation payload for the electronic device is received from the activation server (operation 404) and used to activate the electronic device (operation 406). For example, the activation payload may include a certificate that is used to configure the electronic device for use by a user. The activation payload may also include a regulatory update, which is used to update regulatory information on the electronic device prior to use of the electronic device by the user (operation 408). For example, the regulatory update may include a regulatory identifier for the electronic device that was not available at the electronic device's time of manufacture. The electronic device may replace an existing regulatory identifier on the electronic device with the regulatory identifier, or the electronic device may supplement the existing regulatory identifier with the regulatory identifier.

Figure 5:
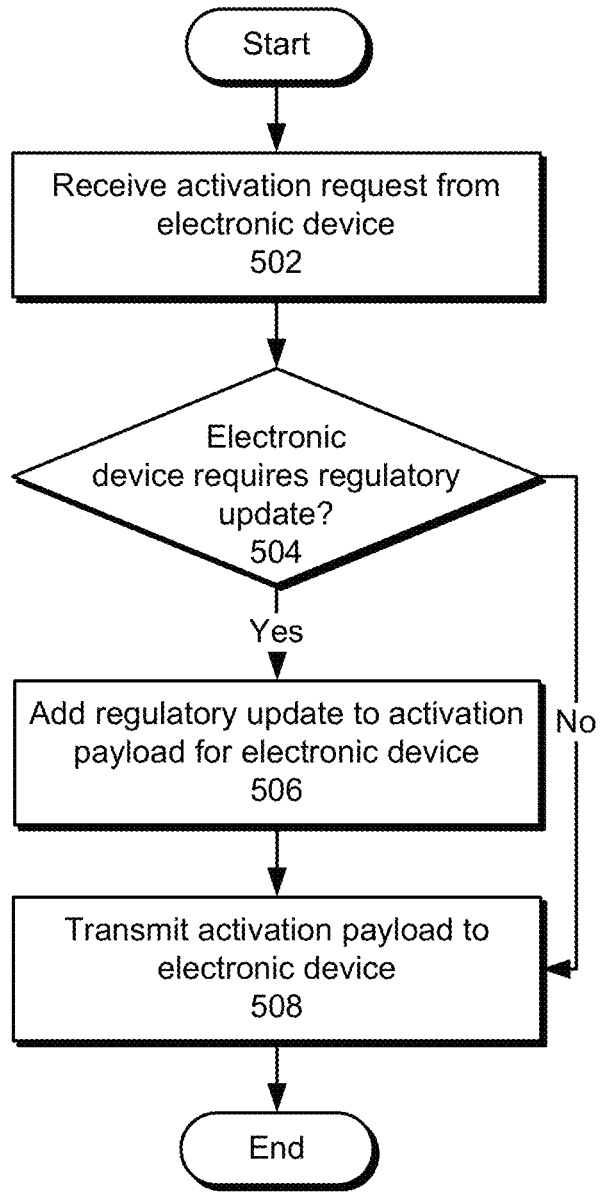
FIG. 5 shows a flowchart illustrating the process of updating an electronic device in accordance with the disclosed embodiments.

FIG. 5 shows a flowchart illustrating the process of updating an electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, an activation request is received from the electronic device (operation 502). The activation request may include status information for the electronic device, such as a serial number, operating system version, device type, and/or hardware type. The activation request may be used to determine if the electronic device requires a regulatory update (operation 504). For example, a database query and/or table lookup may be performed to match the status information from the activation request to any regulatory updates for the electronic device.

Upon detecting that the electronic device requires a regulatory update, the regulatory update is added to an activation payload for the electronic device (operation 506). For example, the regulatory update may be added as an image showing one or more regulatory identifiers for the electronic device. On the other hand, no regulatory update is included in the activation payload if the electronic device does not require any regulatory updates and/or if regulatory information on the electronic device is up-to-date. For example, the activation payload may lack a regulatory update if the electronic device includes the most recent operating system version and/or radio frequency hardware that is already approved for use in the country in which the electronic device is being activated.

Finally, the activation payload is transmitted to the electronic device (operation 508). The activation payload may then be used by the electronic device to activate the electronic device, and the regulatory update may be used by the electronic device to update regulatory information on the electronic device prior to use of the electronic device by a user, as described above with respect to FIG. 4.

Figure 6:
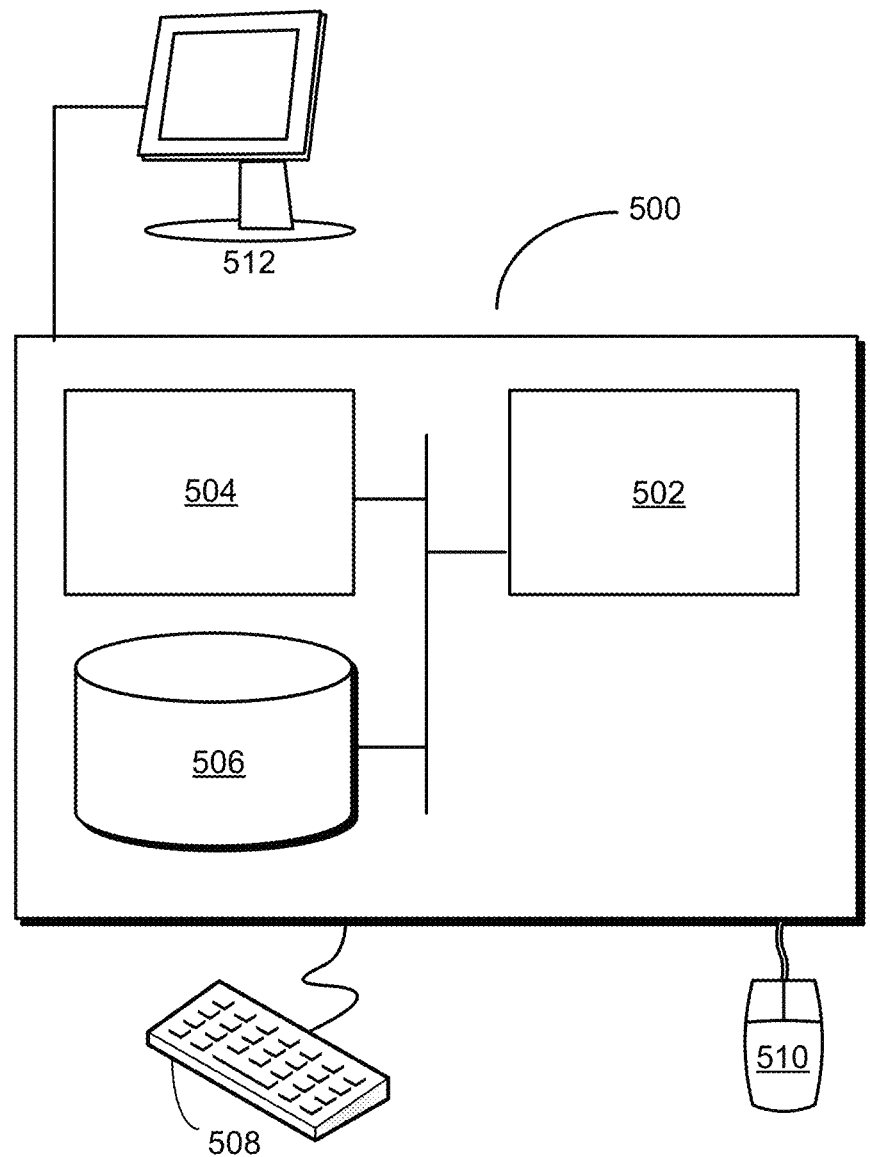
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for activating an electronic device. The system may provide an activation server that receives an activation request from the electronic device. Next, upon detecting, based on the activation request, that the electronic device requires a regulatory update, the activation server may add the regulatory update to an activation payload for the electronic device. Finally, the activation server may transmit the activation payload to the electronic device.

Alternatively, computer system 600 may implement the electronic device. The electronic device may transmit the activation request to the activation server. After receiving the activation payload from the activation server, the electronic device may use the activation payload to activate the electronic device. The electronic device may also use the regulatory update to update regulatory information on the electronic device prior to use of the electronic device by the user.

In addition, one or more components of computer system 600 may be remotely located and connected to the other components over a network. Portions of the present embodiments (e.g., activation server, electronic device, update repository, etc.) may also be located on different nodes of a distributed system that implements the embodiments. For example, the present embodiments may be implemented using a cloud computing system that provides regulatory updates to remote electronic devices during activation of the remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for updating an electronic device, comprising:
receiving an activation request from the electronic device;
upon detecting, based on the activation request, that the electronic device requires a regulatory update, adding the regulatory update to an activation payload for the electronic device, the regulatory update comprising a regulatory identifier, the regulatory identifier comprising an image that indicates that regulatory approval has been obtained for operating the device in at least one corresponding country, wherein the regulatory identifier is one of a replacement for an existing regulatory identifier on the electronic device and a supplement to the existing regulatory identifier; and
transmitting the activation payload to the electronic device, wherein the activation payload is used by the electronic device to activate the electronic device, and wherein the regulatory update is used by the electronic device to update regulatory information on the electronic device as part of the activation.

2. The method of claim 1, wherein the activation request comprises at least one of: a serial number; an operating system version; a device type; and a hardware type.

3. The method of claim 1, wherein detecting that the electronic device requires the regulatory update comprises: matching status information for the electronic device from the activation request to the regulatory update.

4. The method of claim 1, wherein the regulatory information is read-only after activation.

5. A method for activating an electronic device, comprising:
sending an activation request from the electronic device to an activation server;
receiving an activation payload for the electronic device from the activation server, wherein the activation payload comprises a regulatory update, the regulatory update comprising a regulatory identifier, the regulatory identifier comprising an image that indicates that regulatory approval has been obtained for operating the device in at least one corresponding country, wherein the regulatory identifier is one of a replacement for an existing regulatory identifier on the electronic device and a supplement to the existing regulatory identifier;
using the activation payload to activate the electronic device; and
using the regulatory update to update regulatory information on the electronic device as part of the activation.

6. The method of claim 5, wherein the activation request comprises at least one of: a serial number; an operating system version; a device type; and a hardware type.

7. The method of claim 5, wherein using the activation payload to activate the electronic device comprises: obtaining a certificate from the activation payload; and configuring the electronic device based on the certificate.

8. The method of claim 5, wherein sending the activation request from the electronic device to the activation server comprises: transmitting the activation request over a cellular network connection.

9. A system for activating an electronic device, comprising:
an activation server configured to:
receive an activation request from the electronic device;
upon detecting, based on the activation request, that the electronic device requires a regulatory update, add the regulatory update to an activation payload for the electronic device, the regulatory update comprising at least one regulatory identifier, the regulatory identifier comprising an image that indicates that regulatory approval has been obtained for operating the device in at least one corresponding country, wherein the regulatory identifier is one of a replacement for an existing regulatory identifier on the electronic device and a supplement to the existing regulatory identifier; and
transmit the activation payload to the electronic device; and the electronic device configured to:
use the activation payload to activate the electronic device; and
use the regulatory update to update regulatory information on the electronic device as part of the activation.

10. The system of claim 9, wherein the activation request comprises at least one of: a serial number; an operating system version; a device type; and a hardware type.

11. The system of claim 9, wherein detecting that the electronic device requires the regulatory update comprises: matching status information for the electronic device from the activation request to the regulatory update.

12. The system of claim 9, wherein using the activation payload to activate the electronic device comprises: obtaining a certificate from the activation payload; and configuring the electronic device based on the certificate.

13. A computer-readable storage medium storing instructions that when executed by a computer cause the computer to perform a method for activating an electronic device, the method comprising:
sending an activation request from the electronic device to an activation server;
receiving an activation payload for the electronic device from the activation server, wherein the activation payload comprises a regulatory update, the regulatory update comprising a regulatory identifier, the regulatory identifier comprising an image that indicates that regulatory approval has been obtained for operating the device in at least one corresponding country, wherein the regulatory identifier is one of a replacement for an existing regulatory identifier on the electronic device and a supplement to the existing regulatory identifier;
using the activation payload to activate the electronic device; and
using the regulatory update to update regulatory information on the electronic device as part of the activation.

14. The computer-readable storage medium of claim 13, wherein the activation request comprises at least one of: a serial number; an operating system version; a device type; and a hardware type.

15. The computer-readable storage medium of claim 13, wherein using the activation payload to activate the electronic device comprises: obtaining a certificate from the activation payload; and configuring the electronic device based on the certificate.

16. A computer-readable storage medium storing instructions that when executed by a computer cause the computer to perform a method for updating an electronic device, the method comprising:
receiving an activation request from the electronic device;
upon detecting, based on the activation request, that the electronic device requires a regulatory update, adding the regulatory update to an activation payload for the electronic device, the regulatory update comprising a regulatory identifier, the regulatory identifier comprising an image that indicates that regulatory approval has been obtained for operating the device in at least one corresponding country, wherein the regulatory identifier is one of a replacement for an existing regulatory identifier on the electronic device and a supplement to the existing regulatory identifier; and transmitting the activation payload to the electronic device,
wherein the activation payload is used by the electronic device to activate the electronic device, and
wherein the regulatory update is used by the electronic device to update regulatory information on the electronic device as part of the activation.

17. The computer-readable storage medium of claim 16, wherein detecting that the electronic device requires the regulatory update comprises: matching status information for the electronic device from the activation request to the regulatory update.

* * * * *